(12) United States Patent
Kawahara et al.

(10) Patent No.: US 10,576,713 B2
(45) Date of Patent: Mar. 3, 2020

(54) HEAT INSULATING GLASS UNIT FOR VEHICLE AND MANUFACTURING METHOD THEREOF

(71) Applicant: AGC Inc., Chiyoda-ku (JP)

(72) Inventors: Hirotomo Kawahara, Chiyoda-ku (JP); Ryota Nakamura, Chiyoda-ku (JP); Kenichi Suzuki, Chiyoda-ku (JP); Nobutaka Aomine, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 84 days.

(21) Appl. No.: 15/784,348

(22) Filed: Oct. 16, 2017

(65) Prior Publication Data

US 2018/0043658 A1 Feb. 15, 2018

Related U.S. Application Data

(63) Continuation of application No. PCT/JP2016/061739, filed on Apr. 11, 2016.

(30) Foreign Application Priority Data

May 11, 2015 (JP) .................. 2015-096246

(51) Int. Cl.
*C03C 17/23* (2006.01)
*C03C 17/34* (2006.01)
(Continued)

(52) U.S. Cl.
CPC .......... *B32B 17/10201* (2013.01); *B32B 7/02* (2013.01); *B32B 9/045* (2013.01);
(Continued)

(58) Field of Classification Search
CPC .............. C03C 17/2453; C03C 17/253; C03C 2217/211; C03C 2217/215;
(Continued)

(56) References Cited

U.S. PATENT DOCUMENTS 3,881,043 A * 4/1975 Rieser ............... B32B 17/10018
428/81
5,318,830 A * 6/1994 Takamatsu ........ B32B 17/10036
428/216
(Continued)

FOREIGN PATENT DOCUMENTS

CN 103443044 12/2013
GB 2 324 098 A 10/1998
(Continued)

OTHER PUBLICATIONS

International Search Report dated Jul. 12, 2016 in PCT/JP2016/061739 filed Apr. 11, 2016 (with English Translation).
(Continued)

*Primary Examiner* — Z. Jim Yang
(74) *Attorney, Agent, or Firm* — Oblon, McClelland, Maier & Neustadt, L.L.P.

(57) ABSTRACT

A heat insulating glass unit for vehicle includes a laminated glass in which a first glass plate and a second glass plate are bonded to each other via an intermediate film; a color tone compensation film arranged on at least one surface of the laminated glass; a transparent conductive layer mainly including an ITO arranged on the color tone compensation film; and an upper part layer arranged on the transparent conductive layer. A refraction index of the upper part layer for a light with a wavelength of 630 nm is 1.7 or less. The color tone compensation film has at least first and second layers. The first layer is arranged at a position closer to the laminated glass than the second layer. A refraction index of the first layer for a light with a wavelength of 630 nm is greater than a refraction index of the second layer.

20 Claims, 3 Drawing Sheets

(51) Int. Cl.
| | |
|---|---|
| *B32B 17/10* | (2006.01) |
| *C03C 17/245* | (2006.01) |
| *C03C 17/36* | (2006.01) |
| *C03C 17/25* | (2006.01) |
| *B32B 7/02* | (2019.01) |
| *B32B 9/04* | (2006.01) |
| *B60J 1/02* | (2006.01) |

(52) U.S. Cl.
CPC .... *B32B 17/10036* (2013.01); *C03C 17/2453* (2013.01); *C03C 17/2456* (2013.01); *C03C 17/256* (2013.01); *C03C 17/3417* (2013.01); *C03C 17/3618* (2013.01); *C03C 17/3655* (2013.01); *B60J 1/02* (2013.01); *C03C 2217/948* (2013.01)

(58) Field of Classification Search
CPC .. C03C 2217/24–244; C03C 2217/231; C03C 2217/94–948; C03C 17/3417; C03C 17/3618; C03C 17/2456; C03C 17/256; G02B 1/116
See application file for complete search history.

(56) References Cited

U.S. PATENT DOCUMENTS

| | | | | | |
|---|---|---|---|---|---|
| 5,399,435 | A | * | 3/1995 | Ando | B32B 17/10174 428/428 |
| 5,667,880 | A | * | 9/1997 | Okaniwa | C03C 17/3417 428/212 |
| 6,165,598 | A | * | 12/2000 | Nelson | C03C 17/3417 428/212 |
| 6,309,753 | B1 | * | 10/2001 | Grossman | C03C 3/11 428/213 |
| 6,387,515 | B1 | * | 5/2002 | Joret | B32B 17/10036 428/216 |
| 6,797,388 | B1 | * | 9/2004 | Szanyi | C03C 17/3417 427/164 |
| 6,924,037 | B1 | * | 8/2005 | Joret | B32B 17/10 428/432 |
| 2003/0035939 | A1 | * | 2/2003 | Muromachi | B32B 17/10036 428/212 |
| 2004/0005482 | A1 | * | 1/2004 | Kobayashi | G02B 1/115 428/702 |
| 2005/0196623 | A1 | * | 9/2005 | McKown, Jr. | C03C 17/3417 428/432 |
| 2005/0238857 | A1 | * | 10/2005 | Day | B32B 17/10045 428/209 |
| 2007/0108043 | A1 | * | 5/2007 | Lu | C03C 17/2456 204/192.15 |
| 2007/0113881 | A1 | * | 5/2007 | Mellott | C03C 3/087 136/243 |
| 2009/0104385 | A1 | * | 4/2009 | Reymond | B32B 17/10174 428/34 |
| 2009/0109537 | A1 | * | 4/2009 | Bright | G02B 5/287 359/588 |
| 2009/0303602 | A1 | * | 12/2009 | Bright | G02B 1/111 359/585 |
| 2010/0285290 | A1 | * | 11/2010 | Lu | C03C 17/3417 428/213 |
| 2011/0081532 | A1 | * | 4/2011 | Lu | C03C 17/3417 428/216 |
| 2011/0146768 | A1 | * | 6/2011 | Lu | C03C 17/3417 136/255 |
| 2013/0025672 | A1 | * | 1/2013 | Auvray | C03C 17/3435 136/256 |
| 2013/0038834 | A1 | * | 2/2013 | Cado | G02B 1/115 351/159.62 |
| 2013/0129945 | A1 | * | 5/2013 | Durandeau | C03C 17/3417 428/34 |
| 2013/0316140 | A1 | * | 11/2013 | Lu | C03C 17/3417 428/142 |
| 2013/0329295 | A1 | * | 12/2013 | Okuno | G02B 1/116 359/586 |
| 2014/0010976 | A1 | * | 1/2014 | Gerardin | C03C 17/3411 428/34 |
| 2014/0021460 | A1 | * | 1/2014 | Tanida | H01L 51/5268 257/40 |
| 2014/0087101 | A1 | * | 3/2014 | Tixhon | C03C 17/3417 428/34 |
| 2014/0113120 | A1 | * | 4/2014 | Thiel | C03C 17/36 428/212 |
| 2014/0141206 | A1 | * | 5/2014 | Gillard | B32B 17/10036 428/174 |
| 2014/0334006 | A1 | * | 11/2014 | Adib | G02B 1/105 359/580 |
| 2014/0335332 | A1 | * | 11/2014 | Bellman | G02B 1/105 428/212 |
| 2014/0335335 | A1 | * | 11/2014 | Koch, III | G02B 1/105 428/213 |
| 2015/0062710 | A1 | * | 3/2015 | Grillmayer | H01J 37/3405 359/585 |
| 2015/0146286 | A1 | | 5/2015 | Hagen et al. | |
| 2015/0239774 | A1 | * | 8/2015 | Lamine | C03C 17/3435 428/213 |
| 2016/0002098 | A1 | * | 1/2016 | Sternchuss | C03C 17/3417 428/216 |
| 2016/0002099 | A1 | * | 1/2016 | Manz | C03C 17/3417 428/212 |
| 2016/0154254 | A1 | * | 6/2016 | Bolshakov | G02B 1/11 351/159.66 |
| 2016/0214887 | A1 | * | 7/2016 | Illy | C03C 17/3435 |
| 2016/0229741 | A1 | * | 8/2016 | Canova | C03C 17/3423 |
| 2017/0114588 | A1 | * | 4/2017 | Fukuda | C03C 17/36 |
| 2017/0204001 | A1 | * | 7/2017 | Maillet | G02B 5/285 |
| 2018/0134615 | A1 | * | 5/2018 | Burrows | C23C 14/3485 |

FOREIGN PATENT DOCUMENTS

| | | |
|---|---|---|
| JP | H 03-187737 | 8/1991 |
| JP | H 07-210085 | 8/1995 |
| JP | 09-188547 | 7/1997 |
| JP | 11-034216 | 2/1999 |
| JP | 2004-013081 | 1/2004 |
| JP | 2004-149400 | 5/2004 |
| JP | 2011-191338 | 9/2011 |
| JP | 2013-533202 | 8/2013 |
| JP | 2015-512854 | 4/2015 |
| WO | WO 2005/114271 | 12/2005 |
| WO | WO 2008/123553 | 10/2008 |
| WO | WO 2013/132176 A2 | 9/2013 |
| WO | WO 2014/019780 | 2/2014 |
| WO | WO 2015/033067 A1 | 3/2015 |
| WO | WO 2015/055944 A1 | 4/2015 |

OTHER PUBLICATIONS

Written Opinion dated Jul. 12, 2016 in PCT/JP2016/061739 filed Apr. 11, 2016.
International Search Report dated Jul. 12, 2018 in PCT/JP2016/061738 (with English translation), 5 pages.
Written Opinion of International Searching Authority dated Jul. 12, 2016 in PCT/JP2016/061738, 4 pages.
Office Action dated Apr. 4, 2019 in co-pending U.S. Appl. No. 15/727,818, 13 pages.

* cited by examiner

HEAT INSULATING GLASS UNIT FOR VEHICLE AND MANUFACTURING METHOD THEREOF

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/061739 filed on Apr. 11, 2016 and designating the U.S., which claims priority of Japanese Patent Application No. 2015-096246 filed on May 11, 2015. The entire contents of the foregoing application are incorporated herein by reference.

BACKGROUND OF THE INVENTION

1. Field of the Invention

The disclosure herein generally relates to a heat insulating glass unit for vehicle and a manufacturing method thereof.

2. Description of the Related Art

Conventionally, heat insulating glass units that can shield against solar energy flowing into an interior of a vehicle such as a car and prevent a temperature inside the vehicle from rising have been known.

For example, Japanese Unexamined Patent Application Publication No. 2004-149400 discloses a heat insulating glass manufactured by forming a multilayered film configured with an indium tin oxide (ITO) and a silicon oxide ($SiO_2$) layer on a glass substrate.

SUMMARY OF THE INVENTION

Technical Problem

The heat insulating glass disclosed in Japanese Unexamined Patent Application Publication No. 2004-149400 has a feature that a visible light transmittance is high and the heat insulating performance is excellent.

However, the above-described heat insulating glass has a problem such that color characteristics as viewed exhibit angle dependence. That is, the above-described heat insulating glass has a tendency that a color of a reflected light (reflection color) varies by a viewing direction. For example, when the heat insulating glass is viewed from a first direction, the heat insulating glass appears blue, but when the heat insulating glass is viewed from a second direction, the heat insulating glass appears yellow. Because the above-described angle dependence of reflection color for the heat insulating glass creates a strange impression to a user who views the heat insulating glass, it is preferable to control the angle dependence as much as possible.

Moreover, a plate (glass plate) disclosed in Japanese Translation of PCT International Application Publication No. JP-T-2015-512854 includes a heat radiation and reflection coating, has transparency and corrosion resistance, and has a feature of not being damaged upon a bending process.

However, in the plate disclosed in Japanese Translation of PCT International Application Publication No. JP-T-2015-512854, a barrier layer (e.g. silicon nitride) with a thickness of 10 nm or more is required to be arranged. In this case, not only it becomes difficult to keep the angle dependence of a reflection color within a desired range, but also the visible light transmittance decreases when the barrier layer becomes thicker. Especially, in order to achieve the visible light transmittance required in the case of using the plate for a windshield of a car or the like (e.g. a visible light transmittance $T_v$ of 72% or more), it is necessary to compensate for insufficient transmittance by increasing thickness of a layer above the barrier layer (in Japanese Translation of PCT International Application Publication No. JP-T-2015-512854, typically $SiO_2$ or a compound thereof). Thus, productivity deteriorates.

The present invention was made in view of such a problem, and it is an object of the present invention to provide a heat insulating glass unit in which the angle dependence of reflection color is improved. Moreover, the present invention aims at providing a manufacturing method of such a heat insulating glass unit.

Solution to Problem

The present invention provides
a heat insulating glass unit for vehicle including
a laminated glass in which a first glass plate and a second glass plate are bonded to each other via an intermediate film;
a color tone compensation film arranged on at least one surface of the laminated glass;
a transparent conductive layer mainly including an indium tin oxide (ITO) arranged on the color tone compensation film; and
an upper part layer arranged on the transparent conductive layer, a refraction index of the upper part layer for a light with a wavelength of 630 nm being 1.7 or less,
the color tone compensation film having at least a first layer and a second layer,
the first layer being arranged at a position closer to the laminated glass than the second layer, and
a refraction index of the first layer for a light with a wavelength of 630 nm being greater than a refraction index of the second layer for a light with a wavelength of 630 nm.

Moreover, the present invention provides
a manufacturing method of a heat insulating glass unit for vehicle including
(i) preparing a first glass plate and a second glass plate;
(ii) forming a first layer on a first surface of the first glass plate by a sputtering method, and forming a second layer on the first layer, a refraction index of the second layer for a light with a wavelength of 630 nm being less than a refraction index of the first layer, to deposit a color tone compensation film;
(iii) depositing a transparent conductive layer mainly including an indium tin oxide (ITO) on the color tone compensation film by a sputtering method;
(iv) depositing an upper part layer on the transparent conductive layer, a refractive index of the upper part layer for a light with a wavelength of 630 nm being 1.7 or less by a sputtering method; and
(v) bonding the first glass plate and the second glass plate via an intermediate film so that the first surface is arranged on the outside.

Advantageous Effect of Invention

According to an aspect of the present invention, a heat insulating glass unit in which angle dependence of reflection color is rectified can be provided. Moreover, according to an aspect of the present invention, a manufacturing method of such a heat insulating glass unit can be provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, with reference to drawings, an embodiment of the present invention will be described.

(Heat Insulating Glass Unit for Vehicle According to Embodiment of Present Invention)

Figure 1:
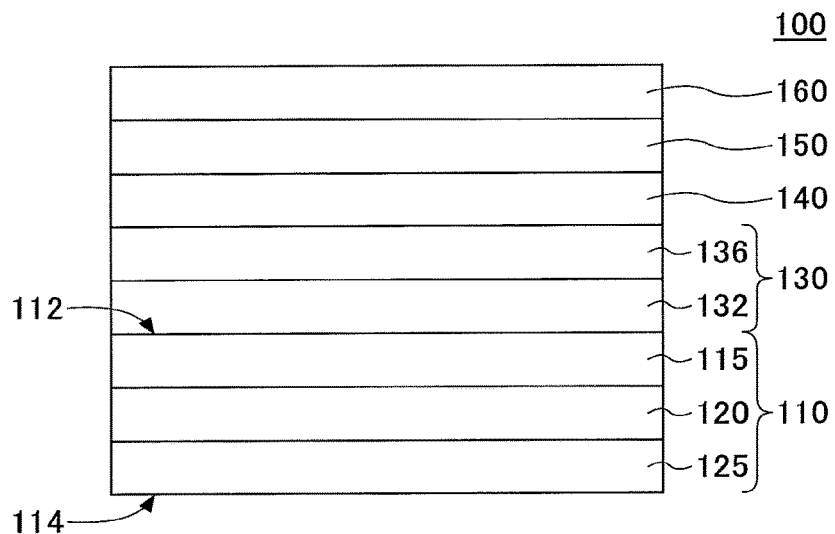
FIG. 1 is a cross sectional diagram schematically depicting a configuration of a heat insulating glass unit for vehicle according to an embodiment of the present invention.

FIG. 1 schematically illustrates a cross section of a heat insulating glass unit for vehicle according to an embodiment of the present invention.

As illustrated in FIG. 1, the heat insulating glass unit 100 includes a laminated glass 110, a color tone compensation film 130, a transparent conductive layer 140, an adhesion improving layer 150, and an upper part layer 160.

The laminated glass 110 includes a first surface 112 and a second surface 114. Each layer (film), which will be described later, is arranged on the first surface 112 side.

The laminated glass 110 is configured by bonding a first glass plate 115 and a second glass plate 125 via an intermediate film 120. Therefore, the first surface 112 of the laminated glass 110 corresponds to the outer surface of the first glass plate 115, and the second surface 114 of the laminated glass 110 corresponds to the outer surface of the second glass plate 125.

The color tone compensation film 130 is arranged on the first surface 112 of the laminated glass 110. The color tone compensation film 130 has a role of adjusting angle dependence of reflection color of the heat insulating glass unit for vehicle 100 by controlling refraction indices of two or more layers included in the color tone compensation film 130.

In the example illustrated in FIG. 1, the color tone compensation film 130 is configured with two layers, i.e. a first layer 132 and a second layer 136. In the above-described configuration, a refraction index of the first layer 132 for a light with a wavelength of 630 nm is higher than a refraction index of the second layer 136 for a light with a wavelength of 630 nm.

However, the above-described configuration is merely an example. The color tone compensation film 130 may be configured with three layers of more.

The transparent conductive layer 140 is arranged above the color tone compensation film 130. The transparent conductive layer 140 is configured with a material mainly including an indium tin oxide (ITO). In the present application, the phrase "layer 'A' mainly includes material 'B'" means that a layer 'A' includes a material 'B' of 50 mass % or more.

The refraction index of the transparent conductive layer 140 for a light with a wavelength of 630 nm falls, for example, within a range of 1.7 to 1.8.

The adhesion improving layer 150 is arranged between the transparent conductive layer 140 and the upper part layer 160, and has a role of suppressing an exfoliation at an interface between both layers. The adhesion improving layer 150 is configured, for example, with a metal oxide such as a tin oxide, a zinc oxide, a cerium oxide, and the like. Note that the arrangement of the adhesion improving layer 150 is optional, and the adhesion improving layer 150 may be omitted.

The upper part layer 160 is arranged on the transparent conductive layer 140, when the adhesion improving layer 150 is absent. When the adhesion improving layer 150 is present, the upper part layer 160 is arranged on the adhesion improving layer 150. In the present application, the term "upper part" in the "upper part layer" means being arranged at a far side from the transparent conductive layer 140 with respect to the laminated glass 110. Therefore, the expression of the "upper part layer" does not necessarily mean that the upper part layer 160 is an uppermost layer (outermost layer) in the application with respect to the ground.

The upper part layer 160 has a role of protecting the transparent conductive layer 140 and enhancing durability of the heat insulating glass unit 100.

However, the upper part layer 160 is required to be arranged so as not to have adverse effects on color characteristics of the heat insulating glass unit 100 and the angle dependence thereof. Therefore, the upper part layer 160 is configured so that the refraction index for a light with wavelength of 630 nm is 1.7 or less. The upper part layer 160 may be configured, for example, with a material mainly including $SiO_2$.

The heat insulating glass unit 100 having the above-described configuration exerts excellent heat insulating properties. For example, an emissivity of the heat insulating glass unit 100 is 0.45 or less. Therefore, when the heat insulating glass unit 100 is applied to, for example, a front glass (windshield), a side glass, a rear glass, and/or a roof glass of an automobile (in the following, they will be referred to as "glass members" as a whole), it becomes possible to significantly control an increase in the temperature inside the vehicle due to an incidence of solar light.

Moreover, the heat insulating glass unit 100 can significantly control the angle dependence of reflection color according to the color compensation film 130 and further interactions between the respective layers 132 to 160. Therefore, when the heat insulating glass unit 100 is applied to, for example, glass members of automobiles or the like, it becomes possible to significantly control variation of color characteristics depending on a viewing direction.

Furthermore, because the heat insulating glass unit 100 has the upper part layer 160 having an abrasion-resistance, it becomes possible to enhance the durability of the heat insulating glass unit 100. For example, when the heat insulating glass unit 100 is applied to a side glass of an automobile, an occurrence of a scratch when moving the side glass up and down for opening/closing can be reduced significantly.

Especially, when the upper part layer 160 is mainly configured with silica ($SiO_2$) in the heat insulating glass unit 100, even if a thinning (wear) occurs in the upper part layer 160, the effect of controlling variation of reflection color depending on a viewing direction continues to be maintained.

(Respective Members Configuring Heat Insulating Glass Unit for Vehicle According to Embodiment of Present Invention)

Next, respective members configuring the heat insulating glass unit for vehicle according to the embodiment will be described in detail. In the following description, when indicating the respective members, for clarification, the reference numerals used in FIG. 1 will be used.

(Laminated Glass 110)

The laminated glass 110 of the heat insulating glass unit for vehicle 100 has two glass plates 115 and 125.

Types of the respective glass plates 115 and 125 are not particularly limited. The type of glass may be a soda lime glass, a quartz glass, a borosilicate glass, an alkali-free glass or the like. The glass plates 115 and 125 may be ultraviolet protection glass plates that can shield against ultraviolet light. In addition, the types of the first glass plate 115 and the second glass plate 125 may be different from each other.

The glass plates 115 and 125 may be colorless or may be colored. Moreover, thicknesses of the glass plates 115 and 125 may fall within a range of, for example, 2 mm to 6 mm.

An intermediate film 120 is arranged between the first and second glass plates 115 and 125.

The intermediate film 120 may be configured with, for example, a transparent resin. For the resin, for example, a polyvinyl butyral (PVB), a polyvinyl chloride, and the like can be used. Moreover, an infrared ray shielding PVB containing dispersed pigments is also effective in order to reduce total solar transmittance $T_{ts}$ (%).

Visible light transmittance, solar radiation transmittance, and transmittance for light with wavelength of 1500 nm of the glass plates 115 and 125 are preferably 70% to 90%, 40% to 65%, and 35% to 60%, respectively. Note that any of the above-described values are obtained by measuring with a measurement method prescribed in JIS.

The glass plates 115 and 125 may be ultraviolet protection glass plates that can shield against ultraviolet light.

A shape of the laminated glass 110 is not necessarily planar. The laminated glass 110 may be curved. Moreover, a thickness of the laminated glass 110 may fall within a range of 2 mm to 6 mm, for example.

(Color Tone Compensation Film 130)

The color tone compensation film 130 has a role of adjusting an angle dependence of reflection color of the heat insulating glass unit 100.

As described above, the color tone compensation film 130 is configured with a plurality of layers including at least the first layer 132 and the second layer 136.

In this case, the first layer 132 closer to the laminated glass 110 has a greater refraction index for a light with a wavelength of 630 nm than a refraction index for a light with a wavelength of 630 nm of the second layer 136. For example, the first layer 132 has a refraction index for a light with a wavelength of 630 nm that falls within a range of 1.7 to 2.5. The refraction index of the first layer preferably falls within a range of 1.8 to 2.3, and more preferably falls within a range of 1.8 to 2.2.

The second layer 136 has a refraction index for a light with a wavelength of 630 nm that is 1.6 or less. The refraction index of the second layer 136 is preferably 1.55 or less.

The first layer 132 mainly includes an oxide or an oxynitride including at least one of Ti, Nb, Ta, Zn, Al, In, Si, and Zr, for example. Especially, among these, an oxide or an oxynitride including at least one of Ti, Nb, Zn, and In is preferable. The first layer 132 may be, for example, titania in which silica of 0.1 mass % to 10 mass % is doped (silica-doped titania).

When the first layer 132 is configured with tin oxide, a crack is likely to occur in the first layer 132 during a subsequent heating process. Therefore, when the manufacturing process of the heat insulating glass unit 100 includes a heat treatment step, it is not preferable to configure the first layer 132 with tin oxide.

A thickness of the first layer 132 falls, for example, within a range of 3 nm to 40 nm, and preferably a range of 5 nm to 35 nm.

The second layer 136 may be configured with a material mainly including any of $SiO_2$, SiON, or $MgF_2$, for example.

A thickness of the second layer 136 falls, for example, within a range of 5 nm to 50 nm, and preferably a range of 10 nm to 45 nm.

(Transparent Conductive Layer 140)

The transparent conductive layer 140 is configured with a material mainly including an indium tin oxide (ITO). ITO has a function of reflecting infrared light.

ITO may include an additive. Such an additive may be, for example, Ga, Zn, Al, Nb, and/or the like.

A mass fraction of tin oxide in the ITO falls within a range of 5% to 12.5% of total mass, and preferably falls within a range of 6.5% to 11% of total mass. For tin oxide mass fractions of 12.5% or less, resistance tends to decrease as amount of tin oxide increases.

Moreover, the transparent conductive layer 140 may include, in addition to ITO, another material of less than 50 mass % at maximum. Such a material may be, for example, sodium, lead, iron, and/or the like.

A thickness of the transparent conductive layer 140 falls preferably, for example, within a range of 100 nm-200 nm, and more preferably within a range of 120 nm to 170 nm.

A refraction index of the transparent conductive layer 140 for a light with a wavelength of 630 nm preferably falls within a range of 1.7 to 1.8 typically.

The transparent conductive layer 140 may be configured by, for example, depositing an amorphous ITO layer on the color tone compensation film 130, and crystallizing the ITO layer. According to the crystallization, a heat treatment temperature falls, for example, within a range of 80° C. to 170° C. By the above-described method, an ITO layer with a low resistance can be obtained.

(Adhesion Improving Layer 150)

The adhesion improving layer 150 is arranged as necessary. By arranging the adhesion improving layer 150, a peel strength may be enhanced between the transparent conductive layer 140 and the upper part layer 160.

The adhesion improving layer 150 may be configured with a metal oxide such as tin oxide, zinc oxide, cerium oxide and/or the like.

A thickness of the adhesion improving layer 150 falls preferably, for example, within a range of 1 nm-10 nm.

(Upper Part Layer 160)

The upper part layer 160 is arranged in order to protect a layer existing below the upper part layer 160, e.g. the transparent conductive layer 140 (and/or the adhesion improving layer 150). For example, by arranging the upper part layer 160 above the transparent conductive layer 140 (and/or the adhesion improving layer 150), it becomes possible to enhance an oxidation resistance of the transparent conductive layer 140 (and/or the adhesion improving layer 150). Moreover, by arranging the upper part layer 160, an abrasion resistance is enhanced, and it becomes possible to control against an occurrence of a thinning (wear), a crack or the like in the transparent conductive layer 140 (and/or the adhesion improving layer 150).

Moreover, when the upper part layer 160 is arranged appropriately, it becomes possible to enhance the transmittance in the visible light range of the heat insulating glass unit 100.

The upper part layer 160 is preferably configured with a material with a refraction index, for a light with a wavelength of 630 nm, of 1.7 or less, and more preferably a material with a refraction index of 1.55 or less. Such a material includes silica ($SiO_2$), SiON, and $MgF_2$. The upper part layer 160 may be a layer mainly including, for example, silica. In this case, it is possible to enhance heat resistance of the transparent conductive layer 140. Moreover, in the case of the layer mainly including silica, even if a thinning (wear) occurs in the upper part layer 160, it is still possible to maintain the same effect of controlling the angle dependence of reflection color as the heat insulating glass unit 100 in the initial period.

The upper part layer 160 may be, for example, a layer of silica in which zirconia is doped (zirconia-doped silica). A dope amount of zirconia with respect to the entire upper part layer 160 preferably falls within a range of 5 mol % to 40 mol %, for example.

A thickness of the upper part layer 160 is preferably 60 nm or less, for example. The thickness of the upper part layer 160 falls more preferably, for example, within a range of 20 nm-60 nm. When the thickness of the upper part layer 160 is 60 nm or less, as described below, an effect whereby it becomes relatively easier to control reflection color from the heat insulating glass unit 100 can be obtained.

(Heat Insulating Glass Unit 100)

The heat insulating glass unit 100 preferably has an emissivity that falls within a range of 0.1-0.45. In the heat insulating glass unit 100 having such an emissivity, it becomes possible to significantly decrease the heat transmission coefficient for light with wavelengths of infrared and far-infrared.

Note that, in the embodiment, reflection color from the heat insulating glass unit 100 is represented by CIE1976 $L^*a^*b^*$ color space (Illuminant D65, field of view of 2°).

Especially, the heat insulating unit 100 according to the embodiment has a feature that a color space of a reflected light generated when a light enters with an incident angle within a range of 0° to 80° is included in a region of $-5 \leq a^* \leq 0$ and $-7.5 \leq b^* \leq 4$. Therefore, in the heat insulating glass unit 100, it is possible to significantly control the angle dependence of reflection color.

The heat insulating glass unit 100 can be applied, for example, to a glass member of a vehicle.

Such a glass member may be, for example, a front windshield, a rear windshield, a side glass, and a roof glass.

In addition, the heat insulating glass unit of the embodiment can also be applied to a window glass of a building, or a glass member of a refrigerating apparatus, a freezer, a show case, and the like.

When the heat insulating glass unit according to the embodiment is mounted on a vehicle, the heat insulating glass unit is arranged so that a surface on which a film is formed is the vehicle interior side. According to the above-described configuration, the heat insulating glass unit in which the angle dependence is improved can be provided. In addition, the heat insulating glass unit may also be mounted so that the surface on which the film is formed is the vehicle exterior side. According to the above-described configuration, the angle dependence of the heat insulating glass unit is improved, and a heat shield effect can further be obtained.

(Manufacturing Method of Heat Insulating Glass Unit for Vehicle According to Embodiment)

Next, with reference to FIG. 2, an example of a manufacturing method of a heat insulating glass unit for vehicle according to the embodiment of the present invention having the above-described features will be described. In the following, as an example, the heat insulating glass unit 100 illustrated in FIG. 1 is employed and a manufacturing method thereof will be described.

Figure 2:
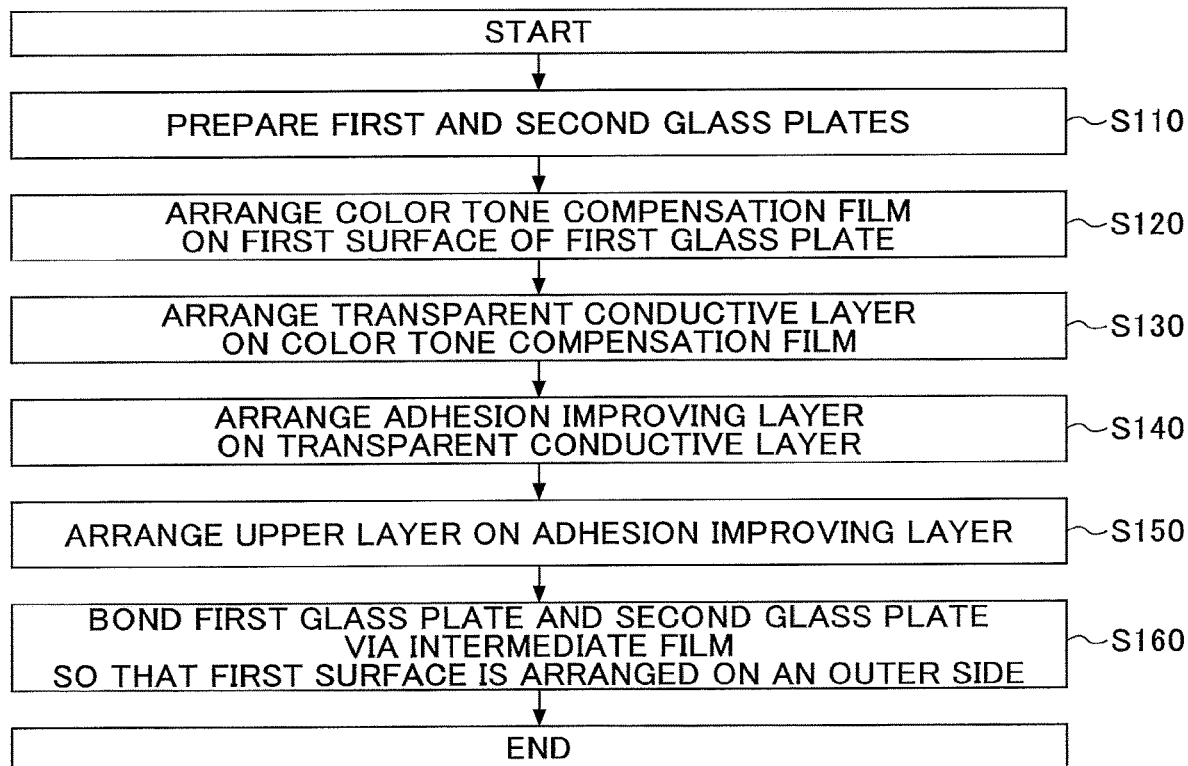
FIG. 2 is a diagram schematically illustrating an example of a flowchart of a manufacturing method for the heat insulating glass unit for vehicle according to the embodiment of the present invention.

FIG. 2 schematically illustrates an example of a flow of the manufacturing method of the heat insulating glass unit for vehicle according to the embodiment.

As illustrated in FIG. 2, the manufacturing method includes a step of preparing a first glass plate and a second glass plate (step S110);

a step of setting up a color tone compensation film on a first surface of the first glass plate (step S120);

a step of arranging a transparent conductive layer above the color tone compensation film (step S130);

a step of arranging an adhesion improving layer above the transparent conductive layer (step S140);

a step of arranging an upper part layer above the adhesion improving layer (step S150); and a step of bonding the first glass plate and the second glass plate via an intermediate film so that the first surface is arranged on an outer side of the plates (step S160).

Note that the step S140, i.e. arranging the adhesion improving layer may be omitted.

In the following, the respective steps will be described in detail. Note that in the following description, when indicating the respective members, for clarification, the reference numerals used in FIG. 1 will be used.

(Step S110)

First, a first glass plate 115 and a second glass plate 125 are prepared.

As described above, compositions of the first glass plate 115 and the second glass plate 125 are not particularly limited, and the first glass plate 115 and the second glass plate 125 may be configured with a soda lime glass, a quartz glass, a borosilicate glass, or an alkali-free glass.

(Step S120)

Next, a color tone compensation film 130 is arranged on one surface (first surface) of the first glass plate 115.

As described above, the color tone compensation film 130 may be formed of a plurality of layers including a first layer 132 and a second layer 136. Among them, the first layer 132 that is closer to the first glass plate 115 is preferably configured with a material mainly including an oxide or an oxynitride including at least one of Ti, Nb, Ta, Zn, Al, In, Si, and Zr, for example. The first layer 132 may be, for example, a layer mainly including a titanium oxide in which silica is doped (silica-doped titania). The second layer 136 may be a layer mainly including silica.

The first layer 132 and the second layer 136 are formed, for example, by a sputtering method, a vacuum evaporation method, an ion plating method, a chemical vapor phase film deposition method, or a wet film deposition method, or the like. The first layer 132 and the second layer 136 are preferably formed by using a sputtering method. This is because an environmental burden of the sputtering method is small and a layer obtained by the sputtering method has a relatively uniform thickness.

The sputtering method includes a DC sputtering method, an AC sputtering method, a DC pulse sputtering method, a high frequency sputtering method, a high frequency superposition DC sputtering method, and the like. As the sputtering method, a magnetron sputtering method may be employed.

The first layer 132 is deposited with a thickness of, for example, 3 nm to 40 nm, and the second layer 136 is deposited with a thickness of, for example, 5 nm to 35 nm.

(Step S130)

Next, a transparent conductive layer 140 mainly including ITO is arranged on the color tone compensation film 130.

The transparent conductive layer 140 may be deposited by using various sputtering methods in the same way as the case of the color tone compensation film 130. When the transparent conductive layer 140 is an ITO layer, upon depositing the transparent conductive layer 140 by a sputtering method, the laminated glass 110 is not preferably heated during the deposition. For example, a temperature of the glass plate 110 during the deposition of the ITO layer by a sputtering method is preferably 100° C. or less.

(Step S140)

Next, an adhesion improving layer 150 is arranged on the transparent conductive layer 140. The adhesion improving layer 150 is configured with, for example, a metal oxide, such as cerium oxide, or zinc oxide.

The method of forming the adhesion improving layer 150 is not particularly limited.

The adhesion improving layer 150 may be formed by directly depositing metal oxide using a conventional method such as various sputtering methods. The metal oxide may be, for example, zinc oxide, or cerium oxide.

Alternatively, the adhesion improving layer 150 may be formed, for example, by depositing a metal film using a conventional method such as a sputtering method, and then oxygenizing the metal film. The metal film may be, for example, zinc or cerium.

In the latter case, the oxidation treatment for the metal film may be performed after deposition of all layers.

Note that Step S150 may be omitted.

(Step S150)

Next, an upper part layer 160 is arranged on the adhesion improving layer 150 (when the adhesion improving layer 150 is absent, on the transparent conductive layer 140). The upper part layer 160 may be configured with a material mainly including silica.

The upper part layer 160 may be deposited using various sputtering methods in the same way as the case of the other layers, including the color tone compensation film 130.

Especially, at steps S120 to S150, all of the respective layers are preferably deposited by a sputtering method. In this case, effects of a film being flexible compared with a thermally oxidized film and of a crack not being likely to occur are obtained.

Note that after forming the upper part layer 160, the entire laminated glass 110 may be subjected to the heat treatment (referred to as a "post heat treatment"). Accordingly, the transparent conductive layer 140 and the upper part layer 160 can be formed to be of few defects.

The post heat treatment is performed, for example, in air at a temperature of 550° C. to 750° C., for about 1 minute to 30 minutes.

When the heat insulating glass unit 100 is applied to a front windshield for vehicle or the like, a bending process is performed for the glass plates 115 and 125. This process is typically performed by means of performing the heat treatment for the glass plates 115 and 125. The temperature of the heat treatment typically falls within a range of 550° C. to 750° C.

The heat treatment temperature for the bending process overlaps with the temperature of the above-described post heat treatment. Therefore, the post heat treatment and the heat treatment of the bending process may be performed simultaneously.

As described above, when such heat treatment is performed, it is not preferable to configure the first layer 132 of the color tone compensation film 130 with tin oxide. This is because when the first layer 132 is configured with tin oxide, a breakage or a crack is likely to occur in the first layer 132 after the heat treatment.

In addition, on the upper part layer 160, another layer (for example, alumina, tantalum oxide, silicon nitride, zircon-boron oxide, and the like) may be formed.

(Step S160)

Next, the first glass plate 115 and the second glass plate 125 are bonded to each other via an intermediate film 120. At this time, the first glass plate 115 is arranged with respect to the second glass plate 125 so that the first surface, i.e. the surface, on which the respective layers are formed, is arranged on the outside. The intermediate film 120 may be a polyvinyl butyral (PVB), or a polyvinyl chloride.

The bonding process is performed by heating and pressurizing a laminated body obtained by arranging the first glass plate 115 and the second glass plate 125 via the intermediate film 120.

According to the above-described processes, the heat insulating glass unit 100 can be manufactured.

As described above, the manufacturing method of the heat insulating glass unit 100 has been described briefly. However, the above-described manufacturing method is merely an example, and it is obvious for a person skilled in the art that the heat insulating glass unit according to the embodiment of the present invention can be manufactured by another manufacturing method.

EXAMPLE

Next, examples of the present invention will be described.

Example 1

A sample of the heat insulating glass unit was manufactured with a method described as follows.

First, two glass plates with a thickness of 2 mm (VFL by Asahi Glass Company, Limited) were prepared. Next, by a sputtering method, on a first surface of one glass plate (first glass plate), as a first layer of a color tone compensation film, titanium oxide including silica (amount of silica was 8 mass %)(refraction index for a light with a wavelength of 630 nm was 2.1537) was deposited. For the deposition, a silica-doped titania target with the amount of silica of 8 mass % was used, and a targeted film thickness was 10 nm.

Next, by a sputtering method, on the titanium oxide layer including silica, as a second layer of the color tone compensation film, a silica layer (refraction index for a light with a wavelength of 630 nm was 1.4620) was deposited. A targeted film thickness was 35 nm.

Next, by a sputtering method, on the color tone compensation film (silica-doped titania layer and silica layer), as a transparent conductive layer, an ITO layer was deposited. The targeted film thickness was 150 nm. Note that, upon deposition, the glass plate was not heated. According to the above-described operation, an amorphous ITO layer was obtained. At a later time, an ITO layer that was crystallized by a post heat treatment (refraction index at a wavelength of 630 nm was 1.7606) was formed.

Next, by a sputtering method, on the ITO layer, as an upper part layer, a silica layer (refraction index at a wavelength of 630 nm was 1.4620) was deposited. A targeted film thickness was 55 nm.

Afterwards, as the post heat treatment, the first glass plate was heated at 650° C. for 7 minutes.

Next, the first glass plate, an intermediate film, and a second glass plate were laminated to form a laminated body. For the intermediate film, a PVB of a thermal absorption type (Saflex S Series by Eastman Chemical Company) was used. By heating at 135° C. and pressurizing the laminated body, a sample of the heat insulating glass unit (referred to as a "sample 1") was obtained.

Note that, at Sample 1, a thickness of the intermediate film was 0.76 mm.

Example 2

A sample of the heat insulating glass unit (referred to as a "sample 2") was manufactured using the same method as Example 1.

In Example 2, the thickness of the silica layer of the upper part layer was 95 nm. The other conditions were the same as in the case of Example 1.

Example 3

A sample of the heat insulating glass unit (referred to as a "sample 3") was manufactured using the same method as Example 1.

In Example 3, as the upper part layer, a silica layer in which zirconia is doped (zirconia-doped silica layer)(refraction index at a wavelength of 630 nm was 1.6831) was deposited. A dope amount of zirconia was 33 mol % of the upper part layer. A targeted thickness of the upper part layer was 55 nm.

Moreover, in Example 3, as the intermediate layer, a PVB of a thermal absorption type (Solar Control Film by Sekisui Chemical Co., Ltd.) was used. The other conditions were the same as in the case of Example 1.

Comparative Example 1

A sample of the heat insulating glass unit was manufactured with a method described as follows.

First, two glass plates with a thickness of 2 mm (VFL by Asahi Glass Company, limited) were prepared. Next, by a sputtering method, on a first surface of one glass plate (first glass plate), as a transparent conductive layer, an ITO layer was deposited. A targeted film thickness was 150 nm. Note that upon deposition the glass plate was not heated. According to the above-described operation, an amorphous ITO layer was obtained.

Next, by a sputtering method, on the ITO layer, as an upper part layer, a silica layer was deposited. A targeted film thickness was 80 nm.

Afterwards, as the post heat treatment, the first glass plate was heated at 650° C. for 7 minutes.

Afterwards, using the same method as Example 1, by bonding the first glass plate and a second glass plate via an intermediate film, a sample of the heat insulating glass unit (referred to as a "sample 4") was obtained.

Comparative Example 2

A sample of the heat insulating glass unit (referred to as a "sample 5") was manufactured using the same method as the comparative example 1.

In the comparative example 2, as an upper part layer, a silica layer in which zirconia is doped (zirconia-doped silica layer) was formed. A dope amount of zirconia was 33 mol % with respect to the upper part layer. A thickness of the upper part layer was 80 nm. Moreover, as an intermediate layer, a PVB of a thermal absorption type (Solar Control Film by Sekisui Chemical Co., Ltd.) was used.

The other conditions were the same as in the case of the comparative example 1.

Comparative Example 3

A sample of the heat insulating glass unit (referred to as a "sample 6") was manufactured using the same method as the comparative example 1.

In the comparative example 3, a thickness of an ITO layer was 135 nm. Moreover, as an upper part layer, by a sputtering method, a silicon nitride layer (SiN layer: refraction index at a wavelength of 630 nm was 2.0898) was foisted. A thickness of the upper part layer was 46 nm. Moreover, as first and second glass plates, soda lime glass plates with a thickness of 2 mm (FL by Asahi Glass Company, limited) were used, and as an intermediate film, a PVB of a thermal absorption type (Solar Control Film by Sekisui Chemical Co., Ltd.) was used.

The other conditions were the same as in the case of the comparative example 1.

Example 4

First, two glass plates with a thickness of 2 mm (VFL by Asahi Glass Company, Limited) were prepared. Next, by a sputtering method, on a first surface of one glass plate (first glass plate), as a first layer of a color tone compensation film, titanium oxide including silica (amount of silica was 8 mass %) (refraction index for a light with a wavelength of 630 nm was 2.1537) was deposited. For the deposition, a silica doped titania target with the amount of silica of 8 mass % was used, and a targeted film thickness was 10 nm.

Next, by a sputtering method, on the titanium oxide layer including silica, as a second layer of the color tone compensation film, a silica layer (refraction index for a light with a wavelength of 630 nm was 1.4620) was deposited. A targeted film thickness was 35 nm.

Next, by a sputtering method, on the color tone compensation film (silica doped titania layer and silica layer), as a transparent conductive layer, an ITO layer was deposited. The targeted film thickness was 150 nm. Note that, upon deposition, the glass plate was not heated. According to the above-described operation, an amorphous ITO layer was obtained. At a later time, an ITO layer that was crystallized by a post heat treatment (refraction index at a wavelength of 630 nm was 1.7606) was formed.

Next, by a sputtering method, on the ITO layer, as an adhesion improving layer, a silicon nitride layer (SiN layer; refraction index at a wavelength of 630 nm was 2.0898) was deposited. A targeted film thickness was 10 nm.

Next, by a sputtering method, on the adhesion improving layer, as an upper part layer, a silica layer (refraction index at a wavelength of 630 nm was 1.4620) was deposited. A targeted film thickness was 55 nm.

Afterwards, as a post heat treatment, the first glass plate was heated at 650° C. for 7 minutes.

Next, the first glass plate, an intermediate film, and a second glass plate were laminated to form a laminated body. For the intermediate film, a PVB (Saflex S Series by Eastman Chemical Company) was used. By heating at 135° C. and pressurizing the laminated body, a sample of the heat insulating glass unit (referred to as a "sample 7") was obtained.

TABLE 1, in the following, shows the configurations of the laminated glass and the layer configurations of Samples 1 to 7 as a whole.

TABLE 1

| sample | laminated glass | | | layer configuration | | | | | |
|---|---|---|---|---|---|---|---|---|---|
| | | | | color tone compensation film | | transparent | adhesion | upper | |
| | first glass plate | intermediate film | second glass plate | first layer | second layer | conductive layer | improving layer | part layer | |
| 1 | VFL | Saflex S Series | VFL | silica doped titania (10 nm) | silica (35 nm) | ITO (150 nm) | — | silica (55 nm) | |
| 2 | VFL | Saflex S Series | VFL | silica doped titania (10 nm) | silica (35 nm) | ITO (150 nm) | — | silica (95 nm) | |
| 3 | VFL | Solar Control Film | VFL | silica doped titania (10 nm) | silica (35 nm) | ITO (150 nm) | — | zirconia doped silica (55 nm) | |
| 4 | VFL | Saflex S Series | VFL | — | — | ITO (150 nm) | — | silica (80 nm) | |
| 5 | VFL | Solar Control Film | VFL | — | — | ITO (150 nm) | — | zirconia doped silica (80 nm) | |
| 6 | FL | Solar Control Film | FL | — | — | TTO (135 nm) | — | SiN (46 nm) | |
| 7 | VFL | Saflex S Series | VFL | silica doped titania (10 nm) | silica (35 nm) | ITO (150 nm) | SiN (10 nm) | silica (55 nm) | |

(Evaluation)

Next, using the respective samples 1 to 7, the following characteristic evaluation was performed.

(Angle Dependence of Reflection Color)

Using the respective samples, by the following method, the angle dependence of reflection color was evaluated.

Using a spectrometer (V570ARM-500N by JASCO Corporation), irradiating with a visible light (wavelength of 300 nm to 800 nm) at a predetermined angle (5° to 70°) from the upper part layer side, an obtained reflection color was measured.

The obtained reflection color was indicated in the CIE 1976 L*a*b* color space (Illuminant D65, 2° field of view).

Results of measurements for Samples 1 to 6 are shown in the following TABLEs 2 to 7. An incident angle (°) is an inclination angle of the incident light from a line (0°) normal to the upper part layer of the sample.

TABLE 2

| incident angle (°) | reflection color | | |
|---|---|---|---|
| | L* | a* | b* |
| 5 | 29.2366 | −0.9234 | 0.5249 |
| 10 | 29.3296 | −1.1344 | 0.6817 |
| 20 | 29.6560 | −1.7624 | 1.0646 |
| 30 | 30.3931 | −2.7134 | 1.3789 |
| 40 | 31.9790 | −3.6536 | 1.1644 |
| 50 | 35.3633 | −4.0454 | 0.1877 |
| 60 | 42.1993 | −3.6497 | −1.0168 |
| 70 | 54.5037 | −3.0006 | −1.4879 |

TABLE 3

| incident angle (°) | reflection color | | |
|---|---|---|---|
| | L* | a* | b* |
| 5 | 22.4252 | −1.8503 | −1.8658 |
| 10 | 22.3885 | −1.7186 | −1.7036 |
| 20 | 22.4027 | −1.4432 | −1.1491 |
| 30 | 22.8784 | −1.4125 | −0.0516 |
| 40 | 24.6129 | −2.1152 | 1.4850 |
| 50 | 28.8776 | −3.4829 | 2.5738 |
| 60 | 37.3036 | −4.5948 | 2.2211 |
| 70 | 51.4528 | −4.7582 | 0.9398 |

TABLE 4

| incident angle (°) | reflection color | | |
|---|---|---|---|
| | L* | a* | b* |
| 5 | 35.1166 | −0.1982 | −0.7265 |
| 10 | 35.1379 | −0.2926 | −0.6011 |
| 20 | 35.2587 | −0.6480 | −0.2179 |
| 30 | 35.6740 | −1.3870 | 0.3522 |
| 40 | 36.8176 | −2.4415 | 0.7892 |
| 50 | 39.5854 | −3.3561 | 0.6124 |
| 60 | 45.5936 | −3.5499 | −0.2000 |
| 70 | 56.9972 | −3.1013 | −0.8195 |

TABLE 5

| incident angle (°) | reflection color | | |
|---|---|---|---|
| | L* | a* | b* |
| 5 | 26.9014 | −12.4863 | 5.8280 |
| 10 | 26.8352 | −12.6533 | 5.3446 |

TABLE 5-continued

| incident angle (°) | reflection color | | |
|---|---|---|---|
| | L* | a* | b* |
| 20 | 26.6757 | −12.8822 | 3.7245 |
| 30 | 26.6250 | −12.4381 | 0.7604 |
| 40 | 27.3238 | −10.4941 | −3.1082 |
| 50 | 30.2514 | −7.0756 | −6.3624 |
| 60 | 37.6658 | −3.8901 | −7.1560 |
| 70 | 51.4817 | −2.6099 | −5.3056 |

TABLE 6

| incident angle (°) | reflection color | | |
|---|---|---|---|
| | L* | a* | b* |
| 5 | 38.9798 | −11.4320 | 18.6487 |
| 10 | 38.9672 | −11.9073 | 18.3890 |
| 20 | 38.9343 | −13.1077 | 17.2719 |
| 30 | 38.9522 | −14.3688 | 14.5752 |
| 40 | 39.3525 | −14.6792 | 9.9804 |
| 50 | 41.1020 | −13.0757 | 4.3754 |
| 60 | 46.1778 | −9.6617 | −0.1098 |
| 70 | 57.1465 | −6.2163 | −1.6160 |

TABLE 7

| incident angle (°) | reflection color | | |
|---|---|---|---|
| | L* | a* | b* |
| 5 | 50.8369 | −7.6487 | −8.1071 |
| 10 | 50.6528 | −7.3736 | −8.5976 |
| 20 | 50.1321 | −6.5221 | −9.9527 |
| 30 | 49.4071 | −5.0593 | −11.7969 |
| 40 | 48.8385 | −3.0732 | −13.4284 |
| 50 | 49.2650 | −0.9741 | −13.7574 |
| 60 | 52.3841 | 0.4058 | −11.4877 |
| 70 | 60.9168 | 0.3300 | −6.3326 |

Figure 3:
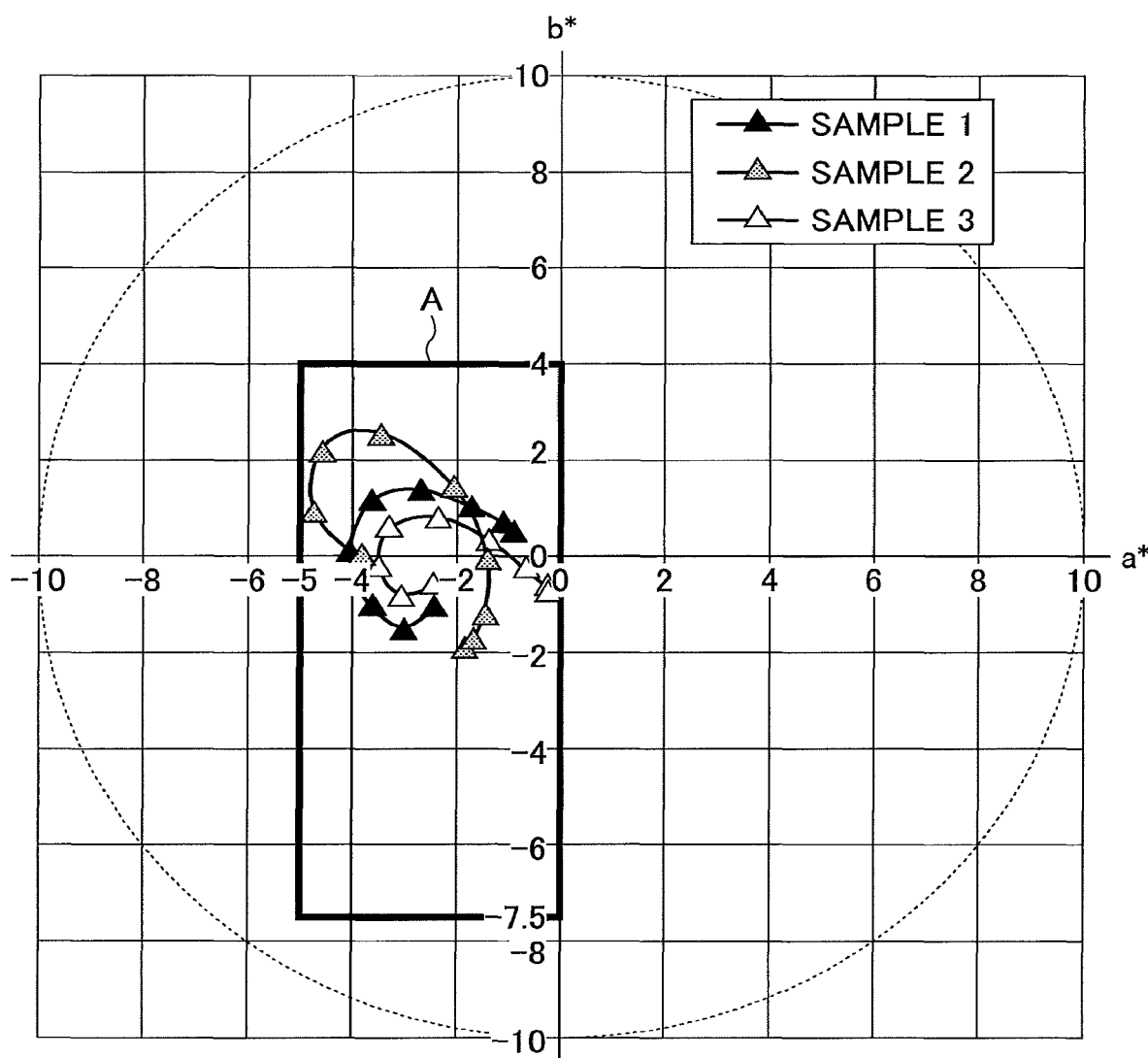
FIG. 3 is a diagram in which reflection colors occurring when irradiating with a light at respective incident angles are plotted in color coordinates in a color space for Samples 1 to 3.

FIG. 3 illustrates reflection color, which is generated upon irradiating with light at the respective incident angles, plotted in color coordinates in the color space for Samples 1 to 3. Similarly, FIG. 4 illustrates reflection color, which is generated upon irradiating with light at the respective incident angles, plotted in color coordinates in the color space for Samples 4 to 6.

Figure 4:
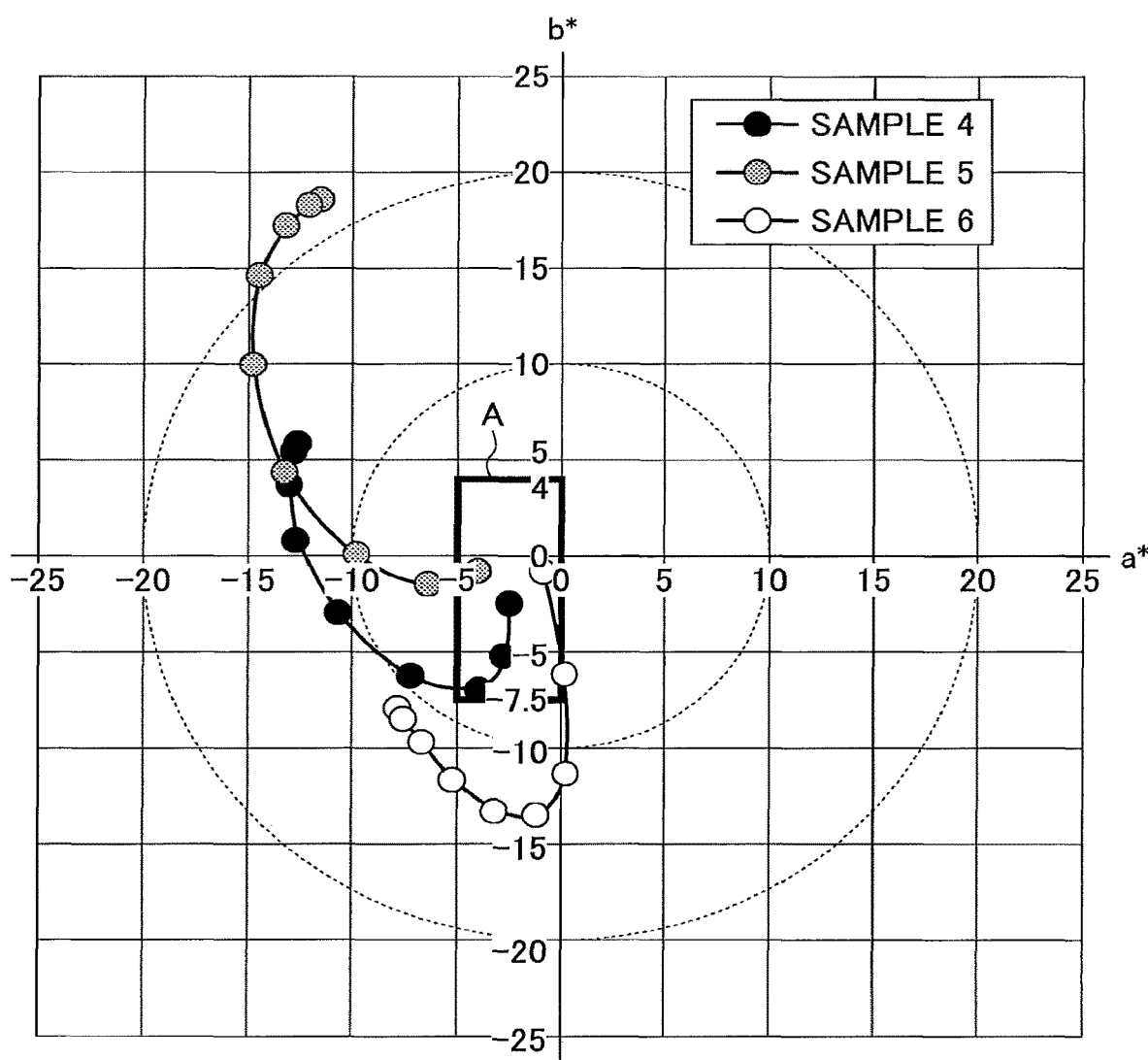
FIG. 4 is a diagram in which reflection colors occurring when irradiating with a light at respective incident angles are plotted in color coordinates in the color space for Samples 4 to 6.

In FIG. 3 and FIG. 4, for the respective samples, variations in the reflection color occurring when the light incident angle changes from 5° to 70° can be grasped quantitatively. Especially, in the case where irrespective of the incident angle, any colors of the reflection light reflected at a heat insulating glass unit are included in a region "A", it can be said that in the heat insulating glass unit the angle dependence of reflection color is significantly controlled.

The region "A" is defined as a range where a* is −5 to 0, and b* is −7.5 to 4. The region "A" is defined as a region in which the reflection color does not give a feeling of strangeness based on the experience of the inventors of glass members for vehicles. Typically, in the case of a glass member for vehicle, as the reflection color, colors near white to light blue tend to be preferred to colors of white to pink. Therefore, the region "A" tends to be somewhat broad on the light blue region side (lower left region of the origin).

From FIG. 3, is was found that for Samples 1 to 3, even if the incident angle changes from 5° to 70°, the color coordinates of the reflection color remain inside the region "A". Therefore, it was confirmed that for Samples 1 to 3, the angle dependence of reflection color from samples was significantly controlled.

In FIG. 4, it was found that for Samples 4 to 6, when the incident angle changes from 5° to 70°, the color coordinates of reflected light greatly deviate from the region "A", and tend to be distributed in an upper left region greatly deviated from the origin (region of strong yellow to yellow-green). Therefore, it was confirmed that for Samples 4 to 6, the angle dependence of reflection color from samples was great, and there was a problem of a strange feeling created upon being viewed.

(Measurement of Visible Light Reflectance, Visible Light Transmittance, and Emissivity)

Next, using Samples 1 to 3, a visible light reflectance, a visible light transmittance, and emissivity were measured.

For the measurement, a spectrophotometer (U4100 by Hitachi, limited) was used. The respective samples are irradiated with light from a lower part (non-film surface, i.e. the second surface 114 side of the laminated glass). Within a range of wavelength of light of 300 nm to 2500 nm, a visible light reflectance and a visible light transmittance for the respective samples were measured. The measurement was performed in compliance with JIS A5759.

An emissivity for the samples (hemispheric emissivity) on an upper part side (film surface, i.e. the upper part layer side) was measured by using an emissivity meter (TSS-5X by Japan Sensor Corporation).

Furthermore, from obtained results, total solar transmittance $T_{ts}$ (%) was obtained following the regulations of ISO 13837.

Results of measurement obtained for Sample 1 are shown in TABLE 8 as a whole:

TABLE 8

| incident angle (°) | visible light reflectance (%) | visible light transmittance (%) | hemispheric emissivity | total solar transmittance $T_{ts}$ (%) |
|---|---|---|---|---|
| 0 | 5.9 | 72.3 | 0.16 | 47.45 |

Results of measurement obtained for Sample 2 are shown in TABLE 9 as a whole:

TABLE 9

| incident angle (°) | visible light reflectance (%) | visible light transmittance (%) | hemispheric emissivity | total solar transmittance $T_{ts}$ (%) |
|---|---|---|---|---|
| 0 | 3.6 | 74.0 | 0.17 | 48.22 |

Results of measurement obtained for Sample 3 are shown in TABLE 10 as a whole:

TABLE 10

| incident angle (°) | visible light reflectance (%) | visible light transmittance (%) | hemispheric emissivity | total solar transmittance $T_{ts}$ (%) |
|---|---|---|---|---|
| 0 | 8.6 | 75.6 | 0.16 | 53.60 |

(Formability: Crack in Film by Bending)

Moreover, two glass plates with a thickness of 2 mm (VFL by Asahi glass Company, Limited) were prepared, films were formed with configurations of Sample 1 and Sample 7 according to the above-described method, respectively, and a glass with film 1 and a glass with film 7 were obtained. Afterwards, a bending test was performed by bending the two glasses with films. Specifically, the glass with film 1 and the glass with film 7 were heated at 640° C. for 10 minutes, and were subjected to a bending and molding processing. Both of the glasses with films were bent to an extent such that the bending radius of curvature was about 60 cm. After the bending test, presence or absence of a crack in films was observed. Results of the observation are shown in TABLE 11.

TABLE 11

| sample | crack in film |
|---|---|
| glass with film 1 | crack was not detected |
| glass with film 7 | crack was not detected |

It was found that from the results of the above-described bending test, a presence or absence of an adhesion improving layer did not change the formability, i.e. irrespective of a presence or absence of the adhesion improving layer, a crack did not occur in a film.

From the above-described results, it was found that any of the visible light reflectance, the visible light transmittance and the emissivity for Samples 1 to 3, are within a proper range as a heat insulating glass unit for vehicle. In this way, it was confirmed that Samples 1 to 3 can be applied to a glass member for vehicle.

INDUSTRIAL APPLICABILITY

The present invention can be used for a glass member for vehicle, a window glass member of a building, and the like.

REFERENCE SIGNS LIST 100 heat insulating glass unit
110 laminated glass
112 first surface of laminated glass
114 second surface of laminated glass
115 first glass plate
120 intermediate film
125 second glass plate
130 color tone compensation film
132 first layer
136 second layer
140 transparent conductive layer
150 adhesion improving layer
160 upper part layer

What is claimed is:

1. A heat insulating glass unit for vehicle comprising:
a laminated glass in which a first glass plate and a second glass plate are bonded to each other via an intermediate film;
a color tone compensation film arranged on at least one surface of the laminated glass;
a transparent conductive layer comprising an indium tin oxide (ITO) arranged on the color tone compensation film; and
an upper part layer arranged on the transparent conductive layer, wherein a refraction index of the upper part layer for a light with a wavelength of 630 nm is 1.7 or less,
wherein the color tone compensation film has at least a first layer and a second layer,
wherein the first layer is arranged at a position closer to the laminated glass than the second layer, wherein the first layer comprises silica-doped titania, wherein a doped amount of silica is from 0.1 to 10 mass %, and wherein a thickness of the second layer is greater than a thickness of the first layer, and
wherein a refraction index of the first layer for a light with a wavelength of 630 nm is greater than a refraction index of the second layer for a light with a wavelength of 630 nm.

2. The heat insulating glass unit for vehicle according to claim 1, wherein a thickness of the transparent conductive layer is from 100 nm to 200 nm.

3. The heat insulating glass unit for vehicle according to claim 1, wherein the upper part layer has a thickness of 60 nm or less.

4. The heat insulating glass unit for vehicle according to claim 1, further comprising:
an adhesion improving layer between the transparent conductive layer and the upper part layer.

5. The heat insulating glass unit for vehicle according to claim 4, wherein a thickness of the adhesion improving layer is less than 10 nm.

6. The heat insulating glass unit for vehicle according to claim 1, wherein the upper part layer comprises $SiO_2$.

7. The heat insulating glass unit for vehicle according to claim 1, wherein the first layer further comprises an oxide or an oxynitride of at least one selected from the group consisting of Nb, Ta, Zn, Al, In, and Zr, and/or wherein the second layer comprises $SiO_2$.

8. The heat insulating glass unit for vehicle according to claim 1, wherein an emissivity is 0.45 or less.

9. The heat insulating glass unit of claim 1, wherein the upper layer comprises a zirconium boron oxide layer.

10. The heat insulating glass unit of claim 4, wherein the adhesion improving layer is a cerium oxide layer.

11. A manufacturing method of a heat insulating glass unit for vehicle, the method comprising:
(i) preparing a first glass plate and a second glass plate;
(ii) forming a first layer on a first surface of the first glass plate by a sputtering method, and forming a second layer on the first layer, wherein a refraction index of the second layer for a light with a wavelength of 630 nm is less than a refraction index of the first layer, to deposit a color tone compensation film, wherein the first layer comprises silica-doped titania,
wherein a doped amount of silica is from 0.1 to 10 mass %, and wherein a thickness of the second layer is greater than a thickness of the first layer;
(iii) depositing a transparent conductive layer comprising an indium tin oxide (ITO) on the color tone compensation film by a sputtering method;
(iv) depositing an upper part layer on the transparent conductive layer by a sputtering method, wherein a refractive index of the upper part layer for a light with a wavelength of 630 nm is 1.7 or less; and
(v) bonding the first glass plate and the second glass plate via an intermediate film so that the first surface is arranged on an outside of the plates.

12. The manufacturing method according to claim 11, wherein the first layer further comprises an oxide or an oxynitride of at least one selected from the group consisting of Nb, Ta, Zn, Al, In, and Zr, and/or wherein the second layer comprises $SiO_2$.

13. The method of claim 11, further comprising:
in (v), performing a bending process for the first glass plate at a temperature of from 550 to 750° C., and
(vi) bonding the bent first glass plate and the second glass plate via an intermediate film.

14. A heat insulating glass unit for vehicle comprising:
a laminated glass in which a first glass plate and a second glass plate are bonded to each other via an intermediate film;
a color tone compensation film arranged on at least one surface of the laminated glass;
a transparent conductive layer comprising an indium tin oxide (ITO) arranged on the color tone compensation film; and
an upper part layer arranged on the transparent conductive layer, wherein a refraction index of the upper part layer for a light with a wavelength of 630 nm is 1.7 or less,
wherein the color tone compensation film has at least a first layer and a second layer,
wherein the first layer is arranged at a position closer to the laminated glass than the second layer, wherein the first layer comprises silica-doped titania, wherein a doped amount of silica is from 0.1 to 10 mass %, and wherein the first layer has a thickness of from 3 to 18 nm, and
wherein a refraction index of the first layer for a light with a wavelength of 630 nm is greater than a refraction index of the second layer for a light with a wavelength of 630 nm.

15. The heat insulating glass unit for vehicle of claim 14, wherein the second layer has a thickness of from 10 to 45 nm.

16. The heat insulating glass unit for vehicle according to claim 14, wherein a thickness of the transparent conductive layer is from 100 nm to 200 nm.

17. The heat insulating glass unit for vehicle according to claim 14, wherein the upper part layer has a thickness of 60 nm or less.

18. The heat insulating glass unit for vehicle according to claim 14, further comprising:
an adhesion improving layer between the transparent conductive layer and the upper part layer.

19. The heat insulating glass unit for vehicle according to claim 15, wherein a thickness of the transparent conductive layer is from 100 nm to 200 nm and a thickness of the upper part layer is 60 nm or less.

20. The heat insulating glass unit for vehicle according to claim 15, further comprising:
an adhesion improving layer between the transparent conductive layer and the upper part layer.

\* \* \* \* \*